(12) United States Patent
Rappaport et al.

(10) Patent No.: US 7,548,909 B2
(45) Date of Patent: Jun. 16, 2009

(54) SEARCH ENGINE DASH-BOARD

(75) Inventors: Alain Thierry Rappaport, Woodside, CA (US); Daniel Ryan Adamson, Dallas, TX (US); Leo Li-Hong Shih, Palo Alto, CA (US); Timothy Byung Choe, Belmont, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/762,391

(22) Filed: Jun. 13, 2007

(65) Prior Publication Data

US 2007/0288439 A1    Dec. 13, 2007

Related U.S. Application Data

(60) Provisional application No. 60/813,389, filed on Jun. 13, 2006.

(51) Int. Cl.
*G06F 7/00* (2006.01)
(52) U.S. Cl. ........................................... 707/3
(58) Field of Classification Search .............. 707/3–6, 707/100
See application file for complete search history.

(56) References Cited

U.S. PATENT DOCUMENTS

| | | | |
|---|---|---|---|
| 2003/0225755 A1* | 12/2003 | Iwayama et al. | 707/3 |
| 2005/0080771 A1* | 4/2005 | Fish | 707/3 |
| 2005/0080795 A1* | 4/2005 | Kapur et al. | 707/100 |
| 2005/0097188 A1* | 5/2005 | Fish | 709/217 |
| 2006/0064411 A1* | 3/2006 | Gross et al. | 707/3 |
| 2007/0038614 A1* | 2/2007 | Guha | 707/4 |
| 2007/0050339 A1* | 3/2007 | Kasperski et al. | 707/3 |
| 2007/0162422 A1* | 7/2007 | Djabarov | 707/2 |

OTHER PUBLICATIONS

International Search Report and Written Opinion dated Jul. 24, 2008 for PCT Application Serial No. PCT/US07/71143, 8 Pages.

* cited by examiner

*Primary Examiner*—Hung T Vy
(74) *Attorney, Agent, or Firm*—Turocy & Watson, LLP

(57) ABSTRACT

A computer system that facilitates presentation of data to a user. A search engine component receives and executes queries on behalf of a user. Results of the query are received and analyzed by an analysis component that filters and organizes the results as a function of relevancy of the data to the user and associated context of the query. A user interface component presents the data to the user in a manner that facilitates easy consumption/processing of data by respective users. The user interface component can dynamically modify display settings as a function of content and type of information displayed, user state, user preferences, explicit or implicit learning, user intent, etc.

14 Claims, 20 Drawing Sheets

Figure 3

Medstory

Search: breast cancer

Welcome, Andrew
Home | My Account | Log Out

Health | Research

Information that Matters™

Results for breast cancer

Visit the Medstory Page on Breast Cancer | NIH Patient Page

Drugs & Substances
- Tamoxifen
- Progesterone
- Cyclophospha...
- Paclitaxel
- Trastuzumab
- Doxorubicin
- Docetaxel
- Fluorouracil
- Epirubicin
- Estradiol
- Anastrozole
- Methotrexate
- Letrozole
- Capecitabine
- Exemestane
- Vinorelbine
- Gemcitabine
- Raloxifene
- Cisplatin
- Cmf Protocol
- Vinblastine
- Filgrastim
- Carboplatin
- Fulvestrant
- Zoledronic Acid

Complementary Medicine
- Soy
- Flavanoids
- Resveratrol
- Black Cohosh
- Vitamin E
- Green Tea
- Omega-3 Fatt...
- Massage
- Sage
- Mistletoe
- Turmeric
- Melatonin
- Vitamin D
- Ginseng
- Acupuncture
- Red Clover
- Meditation
- Vitamin A
- Selenium
- Vitamin D3
- Traditional ...
- Docosahexaen...
- Ganoderma
- Black Tea

Conditions
- Breast Cancer
- Metastasis
- Ovarian Cancer
- Colorectal C...
- Menopause
- Prostate Cancer
- Lung Cancer
- Ductal Carci...
- Pregnancy
- Smoking
- Osteoporosis
- Melanoma
- Anxiety
- Leukemia
- Endometrial ...
- Depression
- Fatigue
- Bone Metastases
- Obesity
- Cervical Cancer
- Heart Disease
- Benign Breas...
- Hodgkin's Di...
- Fractures
- Small Cell L...

Personal Health
- Menopause
- Genetic Pred...
- Osteoporosis
- Genetic Scre...
- Genetic Coun...
- Self Examina...
- Exercise
- Health Insur...
- Pregnancy
- Birth Contro...
- Medicare
- Patient Comp...
- Breast Health
- Breast Augme...
- Weight Gain
- Vaccination
- Aging
- Hospitalization
- Weight Loss
- Cigarette Sm...
- Breastfeeding
- Mental Health
- Uninsured

Procedures
- Chemotherapy
- Screening
- Mammogram
- Mastectomy
- Biopsy
- Radiotherapy
- Endocrine Th...
- Hormone Repl...
- Adjuvant Che...
- Nonadjuvant ...
- Magnetic Res...
- Ultrasound
- Cell Transpl...
- Stem Cell Tr...
- Sentinel Nod...
- Mammoplasty
- Vaccination
- Immunotherapy
- Positron Emi...
- Breast Biopsy
- Oophorectomy
- Hematopoieti...
- Brachytherapy
- Palliative Care
- Ovariectomy

Nutrition
- Soybean
- Tea
- Mushroom
- Cabbage
- Grape
- Potato
- Olive oil
- Coffee
- Pomegranate
- Tomato
- Broccoli
- Carrot
- Pumpkin
- Yam
- Fish oil
- Seaweed
- Lettuce
- Onion
- Soybean oil
- Orange
- Garlic

In Clinical Studies
- Dexecytidine
- G-CSF
- Phytoestrogen
- Bevacizumab
- Lapatinib
- Doxorubicin ...
- Abraxane
- Cladronate
- Isoflavone
- Tibolone
- Genistein
- Pemetrexed
- Ibandronate
- 17 Beta Estr...
- Camptothecin
- Ixabepilone
- Lapin
- GM-CSF
- IL-2
- Aromasin
- Oxaliplatin
- Fenretinide
- Soy Isoflavones
- Selenium
- Arzoxifene

People
- Perez, Edith A
- Yardley, Den...
- Fabian, Carol J
- Burstein, Ha...
- Pegram, Mark D
- Whelan, Timo...
- Goss, Paul E...
- Rugo, Hope S
- Gerber, Judy e
- Ingle, James N
- Hawkins, Mic...
- Chang, Jenny C
- Miller, Kathy
- Overmoyer, B...
- Martin, Miguel
- Levine, Mark...
- Pritchard, K...
- Schott, Anne F
- Schwartz, Ga...
- Bunnell, Cra...
- Gralow, Julie R
- Patel, Rakesh
- Hermann, Rob...

File Edit View Go Bookmarks Tools Help

Medstory

Search: [breast cancer]

Welcome, Andrew
Home | My Account | Log Out

Health | Research

Results for breast cancer

Information that Matters™ ? View More... | Visit the Medstory Page on Breast Cancer | NIH Patient Page

Drugs & Substances
Tamoxifen - Drugs, chemical substances, and...
Trastuzumab-vaccines that are related to your
Anastrozole query.
Progesterone
Letrozole

Conditions
Breast Cancer
Metastases
Ovarian Cancer
Colorectal C....
Prostate Cancer

In Clinical Studies
Lapatinib
17 Beta Estr...
Phytoestrogen
Deoxycytidine
Arzoxifene

Molecular Biology
Iso-sulfan Blue
Cyclin D1
Taxane
Keratin
9,10-Dimethy...

Genes
BRCA1
ERBB2
BRCA2
ABCG2
PGR

Research Centers
National Can...
North Centra...
AstraZeneca
Novartis
Eli Lilly an...

Experts
Horobagyi, ...
Piccart, Mar...
Zheng, Wei
Jordan, V Craig
Kumar, Rakesh

Anatomy
Breast
Ovaries
Axilla
Colon
Milk Ducts

The Web | News Media | Clinical Trials | Research Articles | NIH Grants

The Web 1 to 10 of about 5,710,000

1. GeneReviews: BRCA1 and BRCA2 Hereditary Breast/Ovarian Cancer
BRCA1 and BRCA2 Hereditary Breast/Ovarian Cancer GeneReview. GeneReviews are expert-authored, peer-reviewed, current disease descriptions that apply genetic ...
http://www.geneclinics.org/profiles/brca1/

2. Breast cancer - trastuzumab (No. 34)
TA34 Breast cancer - trastuzumab: Information for the public (pdf) - TA34 Breast cancer - trastuzumab: Information for the public ...
http://www.nice.org.uk/page.aspx?o=TA034

3. Imaginis - Genetic Risk Factors for Breast Cancer
BRCA1 (breast cancer gene 1) and BRCA2 (breast cancer gene 2) are two tumor ... Tamoxifen has been used for twenty years to treat advanced breast cancer. ...
http://imaginis.com/breasthealth/genetic_risks.asp 4. Breast Cancer treatments breast exams and tamoxifen...
Breast cancer, a common cancer in women, is a disease in which cancer (malignant) cells are found in the tissues of the breast. Each breast has 15-20 ...
http://www.cancer-info.com/breast.htm 5. ACS :: Medicines to Reduce Breast Cancer Risk
They found that tamoxifen seemed to reduce breast cancer risk among BRCA carriers (by about 60%) but not among women with BRCA1 mutations. ...
http://www.cancer.org/docroot/CRI/content/CRI_2_6X_Tamoxifen_and_Raloxifene_Questions_and_

Sponsored Results

Tamoxifen and Your Genes
Find out how your genetic profile
can affect your reaction to Drugs.
www.genesanddrugs.com The Ultimate In Wigs
Wide Selection of Synthetic & Human
Hair At Super Prices. Free Ship!
bhoWigs.com Nevada Cancer Institute
A Leader in World-Class, Innovative
Breast Cancer Treatment & Awareness
www.NevadaCancerInstitute.org Breast Cancer Information
What Therapy Choices are Available?
Breast Cancer Treatment Options.
BreastCancerInformation.ca Breast Cancer
Demand that the Senate vote on
stem cell legislation. Act now!
www.DefConAmerica.org Breast Cancer
Helpful Links for
Breast Cancer
www.ToSeekA.com

Figure 7

Medstory

Search: breast cancer

Welcome, Andrew
Home | My Account | Log Out

Health | Research | Results for breast cancer

Information that Matters™ ? View More... | Visit the Medstory Page on Breast Cancer | NIH Patient Page

Drugs & Substances
Tamoxifen
Trastu...
Anastr Tamoxifen (Soltamox,
Proges Nolvadex)
Letrozo...

Genes
BRCA1
ERBB2
BRCA2
ABCG2
PGR

Conditions
Breast Cancer
Metastases
Ovarian Cancer
Colorectal C...
Prostate Cancer

Research Centers
National Can...
North Centra...
AstraZeneca
Novartis
Eli Lilly an...

In Clinical Studies
Lapatinib
17 Beta Estr...
Phytoestrogen
Deoxycytidine
Arzoxifene

Experts
Horobagyi, ...
Piccart, Mar...
Zheng, Wei
Jordan, V Craig
Kumar, Rakesh

Molecular Biology
Iso-sulfan Blue
Cyclin D1
Taxane
Keratin
9,10-Dimethy...

Anatomy
Breast
Ovaries
Axille
Colon
Milk Ducts

Sponsored Results

Tamoxifen and Your Genes
Find out how your genetic profile
can affect your reaction to Drugs.
www.genesanddrugs.com The Ultimate In Wigs
Wide Selection of Synthetic & Human
Hair At Super Prices. Free Ship!
bhoWigs.com Nevada Cancer Institute
A Leader in World-Class, Innovative
Breast Cancer Treatment & Awareness
www.NevadaCancerInstitute.org Breast Cancer Information
What Therapy Choices are Available?
Breast Cancer Treatment Options.
BreastCancerInformation.ca Breast Cancer
Demand that the Senate vote on
stem cell legislation. Act now!
www.DefConAmerica.org Breast Cancer
Helpful Links for
Breast Cancer
www.ToSeeka.com The Web | News Media | Clinical Trials | Research Articles | NIH Grants

The Web 1 to 10 of about 5,710,000

1. GeneReviews: BRCA1 and BRCA2 Hereditary Breast/Ovarian Cancer
   BRCA1 and BRCA2 Hereditary Breast/Ovarian Cancer GeneReview. GeneReviews are expert-authored, peer-reviewed, current disease descriptions that apply genetic ...
   http://www.genedinics.org/profiles/brca1/

2. Breast cancer - trastuzumab (No. 34)
   TA34 Breast cancer - trastuzumab: Information for the public (pdf) · TA34 Breast cancer - trastuzumab: Information for the public ...
   http://www.nice.org.uk/page.aspx?o=TA034

3. Imaginis - Genetic Risk Factors for Breast Cancer
   BRCA1 (breast cancer gene 1) and BRCA2 (breast cancer gene 2) are two tumor ... Tamoxifen has been used for twenty years to treat advanced breast cancer. ...
   http://imaginis.com/breasthealth/genetic_risks.asp 4. Breast Cancer treatments breast exams and tamoxifen...
   Breast cancer, a common cancer in women, is a disease in which cancer (malignant) cells are found in the tissues of the breast. Each breast has 15 - 20 ...
   http://www.cancer-info.com/breast.htm 5. ACS :: Medicines to Reduce Breast Cancer Risk
   They found that tamoxifen seemed to reduce breast cancer risk among BRCA2 carriers (by about 60%) but not among women with BRCA1 mutations. ...
   http://www.cancer.org/docroot/CRI/content/CRI_2_6X_Tamoxifen_and_Raloxifene_Questions_and_

File Edit View Go Bookmarks Tools Help http://beta.medstory.net/app?service=external&page=Search&sp=breast+cancer&s=Web&sf=true&sa=toggleMode Getting Started | Latest Headlines

Medstory BETA

Search: breast cancer

Welcome, Andrew
Home | My Account | Log Out

Health | Research | Results for breast cancer

Information that Matters™ ? View More... | Visit the Medstory Page on Breast Cancer | NIH Patient Page

Drugs & Substances
Tamoxifen
Trastuzumab
Anastrozole
Progesterone
Letrozole

Genes
BRCA1
ERBB2
BRCA2
ABCG2
PGR click to explore this connection...

Conditions
Breast Cancer
Colorectal C...
Prostate Cancer

Research Centers
National Can...
North Centra...
AstraZeneca
Novartis
Eli Lilly an...

In Clinical Studies
Lapatinib
17 Beta Estr...
Phytoestrogen
Deoxycytidine
Arzoxifene

Experts
Hortobagyi, ...
Piccart, Mar...
Zheng, Wei
Jordan, V Craig
Kumar, Rakesh

Molecular Biology
Iso-sulfan Blue
Cyclin D1
Taxane
Keratin
9,10-Dimethy...

Anatomy
Breast
Ovaries
Axilla
Colon
Milk Ducts

The Web | News Media | Clinical Trials | Research Articles | NIH Grants

The Web 1 to 10 of about 5,710,000

1. GeneReviews: BRCA1 and BRCA2 Hereditary Breast/Ovarian Cancer
BRCA1 and BRCA2 Hereditary Breast/Ovarian Cancer GeneReview. GeneReviews are expert-authored, peer-reviewed, current disease descriptions that apply genetic ...
http://www.geneclinics.org/profiles/brca1/

2. Breast cancer - trastuzumab (No. 34)
TA34 Breast cancer - trastuzumab: Information for the public (pdf) · TA34 Breast cancer - trastuzumab: Information for the public ...
http://www.nice.org.uk/page.aspx?o=TA034

3. Imaginis - Genetic Risk Factors for Breast Cancer
BRCA1 (breast cancer gene 1) and BRCA2 (breast cancer gene 2) are two tumor ... Tamoxifen has been used for twenty years to treat advanced breast cancer. ...
http://imaginis.com/breasthealth/genetic_risks.asp 4. Breast Cancer treatments breast exams and tamoxifen...
Breast cancer, a common cancer in women, is a disease in which cancer (malignant) cells are found in the tissues of the breast. Each breast has 15-20 ....
http://www.cancer-info.com/breast.htm 5. ACS :: Medicines to Reduce Breast Cancer Risk
They found that tamoxifen seemed to reduce breast cancer risk among BRCA2 carriers (by about 60%) but not among women with BRCA1 mutations. ...
http://www.cancer.org/docroot/CRI/content/CRI_2_6X_Tamoxifen_and_Raloxifene_Questions_and_

Sponsored Results

Tamoxifen and Your Genes
Find out how your genetic profile can affect your reaction to Drugs.
www.genesanddrugs.com The Ultimate in Wigs
Wide Selection of Synthetic & Human Hair At Super Prices. Free Ship!
bhsWigs.com Nevada Cancer Institute
A Leader in World-Class, Innovative Breast Cancer Treatment & Awareness
www.NevadaCancerInstitute.org Breast Cancer Information
What Therapy Choices are Available? Breast Cancer Treatment Options.
BreastCancerInformation.ca Breast Cancer
Demand that the Senate vote on stem cell legislation. Act now!
www.DefConAmerica.org Breast Cancer
Helpful Links for
Breast Cancer
www.ToSeekA.com

Figure 12

Medstory

Search: breast cancer

Welcome, Andrew
Home | My Account | Log Out

Health | Research | Results for breast cancer

Information that Matters™ ? View More... | Visit the Medstory Page on Breast Cancer | NIH Patient Page

Drugs & Substances
Tamoxifen
Trastuzumab
Anastrozole
Progesterone
Letrozole

Genes
BRCA1
ERBB2
BRCA2
ABCG2
PGR

Conditions
More on Tamoxifen and breast cancer:
Information on the drug Tamoxifen, used to treat breast cancer. [Source]
Breast cancer, a common cancer in women, is a disease in which cancer (malignant) cells are found in the tissues of the breast. Each breast has 15- 20 ... [Source]
Is tamoxifen used as part of chemotherapy for breast cancer? ... How does raloxifene compare with tamoxifen in preventing breast cancer? ... [Source]

In Clinical Studies
Lapatinib
17 Beta Estr...
Phytoestrogen
Deoxycytidine
Arzoxifene

Experts
Hortobagyi, ...
Piccart, Mer...
Zheng, Wei
Jordan, V Craig
Kumar, Rakesh

Molecular Biology
Iso-sulfan Blue
Cyclin D1
Taxane
Keratin
9,10-Dimethy...

Anatomy
Breast
Ovaries
Axilla
Colon
Milk Ducts

The Web

Other concepts that are associated with both Tamoxifen and breast cancer:
Chemotherapy
Anastrozole
Endocrine Therapy
Metastases

The Web 1 to 1

1. GeneReviews
   BRCA1 and BR...
   expert-authored, peer-reviewed, current disease descriptions that apply genetic ...
   http://www.geneclinics.org/profiles/brca1/

2. Breast cancer - trastuzumab (No. 34)
   TA34 Breast cancer - trastuzumab: Information for the public (pdf) · TA34 Breast cancer - trastuzumab: Information for the public. ...
   http://www.nice.org.uk/page.aspx?o=TA034

3. Imaginis - Genetic Risk Factors for Breast Cancer
   BRCA1 (breast cancer gene 1) and BRCA2 (breast cancer gene 2) are two tumor ... Tamoxifen has been used for twenty years to treat advanced breast cancer. ...
   http://imaginis.com/breasthealth/genetic_risks.asp 4. Breast Cancer treatments breast exams and tamoxifen...
   Breast cancer, a common cancer in women, is a disease in which cancer (malignant) cells are found in the tissues of the breast. Each breast has 15-20 ...
   http://www.cancer-info.com/breast.htm 5. ACS :: Medicines to Reduce Breast Cancer Risk
   They found that tamoxifen seemed to reduce breast cancer risk among BRCA2 carriers (by about 60%) but not among women with BRCA1 mutations. ...
   http://www.cancer.org/docroot/CRI/content/CRI_2_6X_Tamoxifen_and_Raloxifene_Questions_and_

Sponsored Results

Tamoxifen and Your Genes
Find out how your genetic profile can affect your reaction to Drugs.
www.genesanddrugs.com The Ultimate In Wigs
Wide Selection of Synthetic & Human Hair At Super Prices. Free Ship!
bhoWigs.com Nevada Cancer Institute
A Leader in World-Class, Innovative Breast Cancer Treatment & Awareness
www.NevadaCancerInstitute.org Breast Cancer Information
What Therapy Choices are Available? Breast Cancer Treatment Options.
BreastCancerInformation.ca Breast Cancer
Demand that the Senate vote on stem cell legislation. Act now!
www.DefConAmerica.org Breast Cancer
Helpful Links for Breast Cancer
www.ToSeekA.com

Figure 13

Medstory BETA

Welcome, Andrew
Home | My Account | Log Out

Search: [breast cancer]

| Health | Research | Results for breast cancer |

Information that Matters™ ? View More... | Visit the Medstory Page on Breast Cancer | NIH Patient Page

Drugs & Substances
Tamoxifen
Trastuzumab
Anastrozole
Progesterone
Letrozole

Genes
BRCA1
ERBB2
BRCA2
ABCG2
PGR

Conditions
Breast Cancer
Metastases
Ovarian Cancer
Colorectal C...
Prostate Cancer

Research Centers
National Can...
North Centra...
AstraZeneca
Novartis
Eli Lilly an...

In Clinical Studies
Lapatinib
17 Beta Estr...
Phytoestrogen
Deoxycytidine
Arzoxifene

Experts
Hortobagyi, ...
Piccart, Mer...
Zheng, Wei
Jordan, V Craig
Kumar, Rakesh

Molecular Biology
Iso-sulfan Blue
Cyclin D1
Taxane
Keratin
9,10-Dimethy...

Anatomy
Breast
Ovaries
Axilla
Colon
Milk Ducts

| The Web | News Media | Clinical Trials | Research Articles | NIH Grants |

News & Media 1 to 10 of 244                                AutoFocused | Sort by Date 1. Pregnancies Lower Breast Cancer Risk In BRCA1 And BRCA2 Mutation Carriers
   ...to develop breast cancer after age 40 is the lower, the more pregnancies she has had... increased breast cancer risk. [click link for full article...
   *Breast Cancer News From Medical News Today 05-30-2006*

2. Number Of Pregnancies Associated With Decreased Breast Cancer Risk In BRCA1 And BRCA2 Mutation Carriers
   ...reduction in breast cancer risk with increasing number of pregnancies carried to full...1 and BRCA2 mutations are known to increase a women's risk of breast cancer... click...
   *Breast Cancer News From Medical News Today 04-26-2006*

3. High-risk women should get breast cancer MRI: study
   Though rare, the inherited BRCA1 and BRCA2 genetic mutations increase a woman's lifetime risk of breast cancer by as much as 80 percent...
   *Reuters: Health 05-23-2006*

4. Combination Of MRI, Mammographies For BRCA1 Carriers Is Cost-Effective, Study Says
   Annual breast cancer screenings using mammograms and magnetic resonance imaging are cost-effective for women ages 35 to 54 who have the BRCA1 genetic mutation, according...
   *Breast Cancer News From Medical News Today 05-25-2006*

5. [Genes: Structure and Regulation] BRCA1 Plays a Role in the Hypoxic Response by Regulating HIF-1 (alpha) Stability and by Modulating Vascular Endothelial Growth Factor Expression
   A recent study of breast cancer patients with and without BRCA1 gene mutations found... (Tarnowski, B., Chudecka-Glaz, A., Gorski,

Sponsored Results

Tamoxifen and Your Genes
Find out how your genetic profile can affect your reaction to Drugs.
www.genesanddrugs.com The Ultimate In Wigs
Wide Selection of Synthetic & Human Hair At Super Prices. Free Ship!
bhoWigs.com Breast Cancer Resources
Providing World-Class, Research-Based, Innovative Cancer Care
www.NevadaCancerInstitute.org Breast Cancer Information
What Therapy Choices are Available? Breast Cancer Treatment Options.
BreastCancerInformation.ca Breast Cancer
Demand that the Senate vote on stem cell legislation. Act now!
www.DefConAmerica.org Breast Cancer
Helpful Links for Breast Cancer
www.ToSeekiA.com

Figure 14

Medstory

Search: breast cancer

Welcome, Andrew
Home | My Account | Log Out

Health | Research

Results for breast cancer

Information that Matters™ — View More... | Visit the Medstory Page on Breast Cancer | NIH Patient Page

Drugs & Substances
Tamoxifen
Trastuzumab
Anastrozole
Progesterone
Letrozole

Conditions
Breast Cancer
Metastases
Ovarian Cancer
Colorectal C...
Prostate Cancer

In Clinical Studies
Lapatinib
17 Beta Estr...
Phytoestrogen
Deoxycytidine
Arzoxifene

Molecular Biology
Iso-sulfan Blue
Cyclin D1
Taxane
Keratin
9,10-Dimethy...

Genes
BRCA1
ERB62
BRCA2
ABCG2
PGR

Research Centers
National Can...
North Centra...
AstraZeneca
Novartis
Eli Lilly an...

Experts
Hortobagyi, ...
Picoart, Mar...
Zheng, Wei
Jordan, V Craig
Kumar, Rakesh

Anatomy
Breast
Ovaries
Axilla
Colon
Milk Ducts

The Web | News Media | Clinical Trials | Research Articles | NIH Grants

AutoFocused | Sort by Date

Clinical Trials 1 to 10 of about 1,356

Refine: Phase: Any | Status: Any | Location:

1. Arzoxifene and Tamoxifen in Preventing Breast Cancer in Women at High Risk for Breast Cancer
   ...therapy using arzoxifene and tamoxifen may prevent breast cancer by lowering the amount of estrogen the body makes in women at high risk for breast cancer. PURPOSE: This...
   Phase 2 - Completed 2. Methods in Education for Breast Cancer Genetics
   ...breast cancer genetics program at the National Naval Medical Center's Breast Care Center... which confer increased lifetime risks for breast and ovarian cancer, were offered under...
   No longer recruiting 3. Carboplatin or Docetaxel in Treating Women With Metastatic Genetic Breast Cancer
   ...than docetaxel in treating patients with metastaticgenetic breast cancer. PURPOSE... to docetaxel in treating women with metastatic genetic breast cancer...
   Phase 2 - Recruiting 4. A Phase I Trial of Tamoxifen and 9-cis-Retinoic Acid in Breast Cancer Patients
   This is a dosage escalation study to estimate the maximum tolerated dose of 9-cis-retinoic acid given in combination with tamoxifen. Groups of 3 to 6 ...
   Phase 1 - Completed 5. Establishing the Incidences of BRCA1 and BRCA2 Mutation by Combining DHPLC and Direct Sequencing in Ovarian Cancer

Sponsored Results

Tamoxifen and Your Genes
Find out how your genetic profile can affect your reaction to Drugs.
www.genesanddrugs.com

The Ultimate In Wigs
Wide Selection of Synthetic & Human Hair At Super Prices. Free Ship!
bhdWigs.com

Breast Cancer Resources
Providing World-Class, Research-Based, Innovative Cancer Care
www.NevadaCancerInstitute.org

Breast Cancer Information
What Therapy Choices are Available? Breast Cancer Treatment Options.
BreastCancerInformation.ca

Federal Stem Cell Funding
Tell your Senator that you demand a vote on federal stem cell funding
www.DefConAmerica.org

Breast Cancer
Helpful Links for
Breast Cancer
www.ToSeekA.com

Figure 15

Figure 16

SEARCH ENGINE DASH-BOARD

CROSS-REFERENCE TO RELATED APPLICATION

This application claims the benefit of U.S. Provisional Application No. 60/813,389 entitled SEARCH ENGINE DASHBOARD, filed on Jun. 13, 2006. The entirety of this application is incorporated herein by reference.

BRIEF DESCRIPTION OF DRAWINGS

FIGS. 2-16 illustrate user interfaces in accordance with embodiments.

DETAILED DESCRIPTION OF INVENTION

Figure 1A:
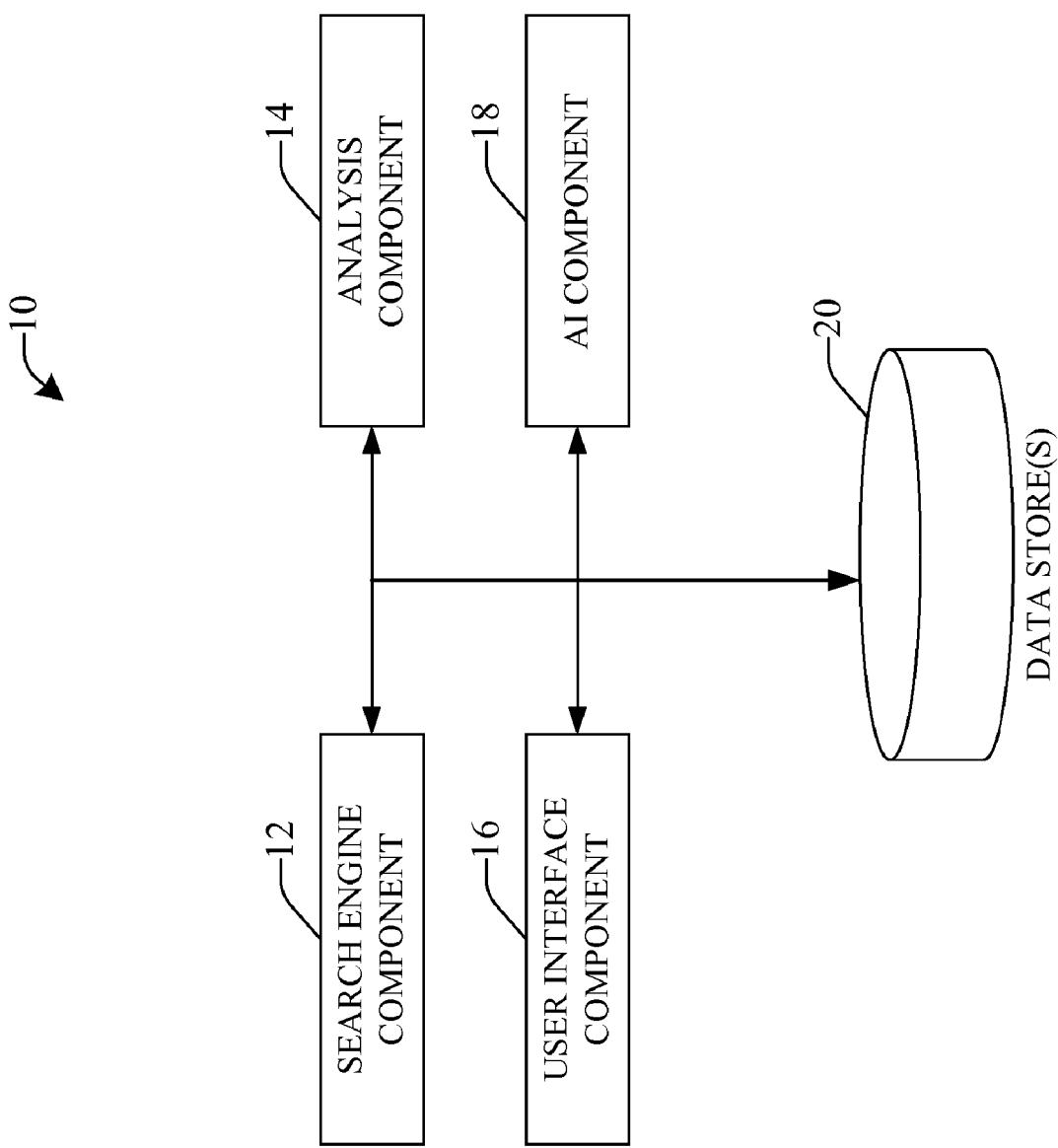
FIG. 1a is a block diagram of a computer system that facilitates presenting medical-related data to users as a function of relevancy to users.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further, the terms "component," "system," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the term "service" can refer to executing a software, such as using a toolbar or web-based email engine; retrieving information (e.g., status of a pending patent application, a proposal submission, immigration process, or package delivery); purchasing goods; making a payment (e.g. mortgage, rent, student loan, credit card, car, phone, utilities, late fees); taking a class at an online school; making an appointment with an offline provider (e.g., dentist, medical doctor, lawyer, hairdresser, mechanic); or registering for an online or offline conference. It should be appreciated that this listing of services is provided as an illustration.

The term "intelligence" has two meanings: (i) it refers to information that characterizes history or behavior of a person or an entity, and to records of commercial and non-commercial activities involving a product or service, or a combination thereof, of the person or entity; and (ii) it refers to the ability to reason or draw conclusions about, e.g., infer, the current or future state of a system or behavior of a user based on existing information about the system or user. Artificial intelligence (AI) can be employed to identify a specific context or action, or generate a probability distribution of specific states of a system or behavior of a user without human intervention. Artificial intelligence relies on applying advanced mathematical algorithms—e.g., decision trees, neural networks, regression analysis, cluster analysis, genetic algorithm, and reinforced learning—to a set of available data (information) on the system or user.

As described in greater detail below, a unique user interface scheme is described that provides for a rich manner to view data in a glanceable manner as a function of relevancy.

FIG. 1a depicts a computer system 10 that facilitates presentation of data to a user. A search engine component 12 receives and executes queries on behalf of a user. Results of the query are received and analyzed by an analysis component 14 that filters and organizes the results as a function of relevancy of the data to the user and associated context of the query. It is to be appreciated that the analysis component 14 can also assist with reformulating search queries, or generating supplemental queries as a function of determined or inferred intent of the user, or relevancy of search results. A user interface component 16 presents the data to the user in a manner that facilitates easy consumption/processing of data by respective users. The user interface component 16 can dynamically modify display settings as a function of content and type of information displayed, user state, user preferences, explicit or implicit learning, user intent, etc.

User intent can be obtained in a variety of manners such as for example, explicit expression of user intent, implicit expression, determined or inferred user intent. Moreover, a variety of instruments or mechanisms can be employed to obtain user intent (e.g., portals, pop-up windows, queries, statements, utterances, inferences, extrinsic evidence, historical data, machine learning systems, etc.). Veracity of the user intent as well as confidence measures associated therewith can also be calculated or factored in connection with ranking, organization and presentation of the data.

An optional learning and reasoning system, referred to as artificial intelligence (AI) component 18 can be employed to determine or infer user intent, user state, user context, user goals, and relevancy of results. The AI component 18 can be employed in connection with making determinations or inferences regarding optimization decisions and the like. The AI component 18 can employ a probabilistic-based or statistical-based approach, for example, in connection with making determinations or inferences. The inferences can be based in part upon explicit training of classifier(s) (not shown) before employing the system 10, or implicit training based at least upon a user's or provider's previous actions, commands, instructions, and the like during use of the system. Data or policies used in optimizations can be collected from specific users or services/goods providers or from a community of users and providers.

The AI component 18 can employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Methods also include methods for capture of logical relationships such as theorem provers or more heuristic rule-based expert systems. Inferences derived from such learned or manually constructed models can be employed in optimization techniques, such as linear and non-linear programming, that seek to maximize some objective function. For example, maximizing the overall efficiency of determining or inferring user intent, identifying prospective and relevant services/goods providers, dynamically calculating, or conveying data as well as associated bi-directional filtering to optimize data consumption, resource utilization, optimizing return on investment (ROI), and the like.

The optimization policies can take into consideration inferences about user intent, goals, uncertainty, sporadic behavior, point of sale, inventory, time to delivery, quality, ratings, rankings, reputation, authenticity, reliability, and other factors that are considered in connection with searches and commercial transactions, for example.

The AI component 18, can take into consideration historical data, and data about the current context (users, or providers). Policies can be employed that consider including consideration of the cost of making an incorrect determination or inference versus benefit of making a correct determination or inference. Accordingly, an expected-utility-based analysis can be used to provide inputs or hints to other components or for taking automated action directly. Ranking and confidence measures can be calculated and employed in connection with such analysis. For example, the cost of making an incorrect decision regarding displaying and manner of displaying a particular set of data versus expected benefit/cost to the user can be factored into decisions as part of the optimization process.

Policies can be employed that optimize display of data per sets of users. In view of the foregoing example, it will be appreciated that optimization is dynamic and policies selected and implemented will vary as a function of the numerous parameters (e.g., supply/demand, user state, user goals, user preferences, costs, efficiency, available time, schedules, environment, inventory, workflow, advertising, price points, equilibrium points, market saturation levels, expected future demand, backlogs, trends, fads, dumping strategies, competitor analysis, user and provider tolerance levels, risk analysis, . . . ); and thus the AI component 18 is adaptive.

A data store 20 can store data (e.g., queries, historical information, profiles, preferences, policies, heuristics, software, search results, filters, templates, etc.) associated with the system 10.

Figure 1B:
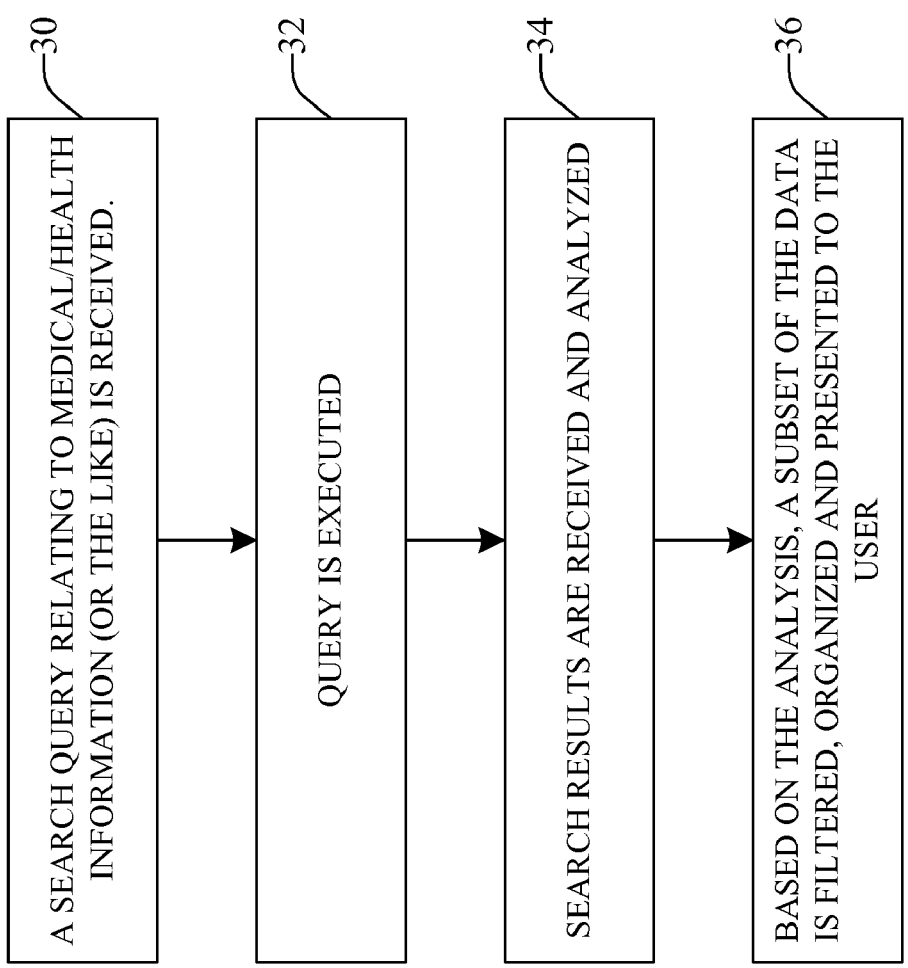
FIG. 1b is a flow diagram of one particular methodology for carrying out an embodiment.

FIG. 1b illustrates a methodology in accordance with the claimed subject matter. While, for purposes of simplicity of explanation, the methodology is shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

At 30, a search query relating to medical/health information (or the like) is received. At 32, the query is executed. It is to be appreciated that query can be refined or reformulated (e.g., as a function of determined or inferred user intent, or goals) prior to execution. Likewise, multiple queries can be executed as a function of feedback relating to relevancy of results and user satisfaction. At 34, the search results are received and analyzed. The analysis can include performing a utility analysis with respect to value of data to the user, relevancy of data, type of data, context of data, user state, user context, user intent, user goals, ability of user to comprehend data, cognitive load of the user, etc.

At 36, based on the analysis, a subset of the data is filtered, organized and presented to the user as described in greater detail infra.

Figure 1C:
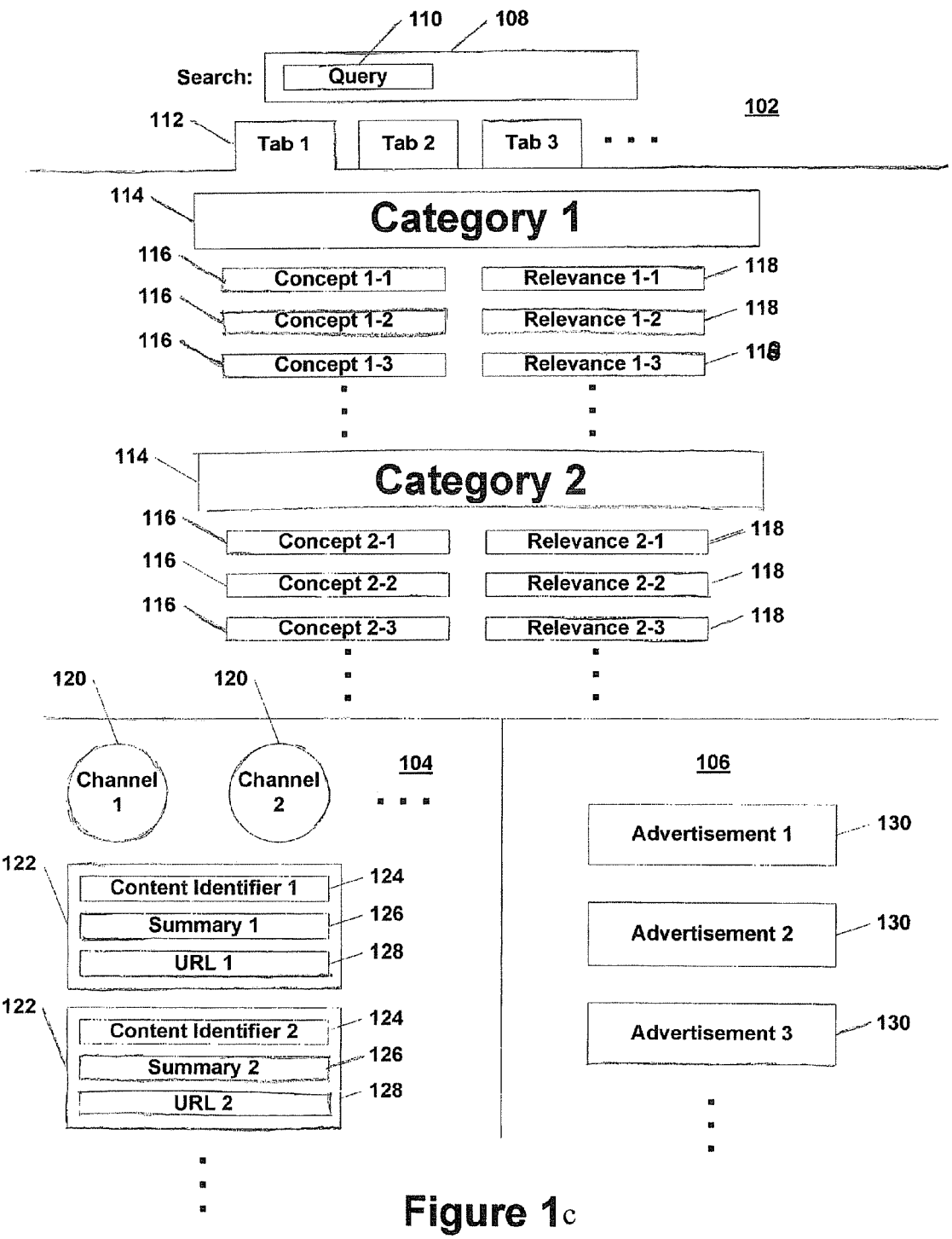
FIG. 1c illustrates a web-based, search engine user interface in the form of a web page.

FIG. 1c illustrates a web-based, search engine user interface 100 in the form of web page, in accordance with one embodiment of the present invention. The user interface 100, sometimes referred to as a dashboard, or search engine dashboard, includes multiple information panes to display content-related information. In the illustrated embodiment, the user interface includes a relevance pane 102, a channel pane 104, and an advertisement pane 106. The user interface 100 typically receives a web-based search query from a user and organizes and displays search results and/or search query-related information to the user. The search results and query-related information are provided by a search engine, such as a horizontal, vertical, or any other type of search engine known to those of skill in the art.

The relevance pane 102 includes a search window 108 into which a user enters a search query 110. Information on the user interface 100 is organized by window tabs 112. The window tabs 112 each correspond to a particular user's status. Window tabs 112 are sometime referred to as tabs, user tabs, status tabs, group tabs, role tabs, personal tabs, personal user tabs, community tabs, or any other tabs. For example, in one embodiment, the user status can correspond to a medical patient, a researcher, a marketer, a service provider, a doctor, a nurse, a student, or any other such user status. In the illustrated embodiment, two window tabs 112 are provided: a health tab and research tab, which correspond to consumer or patient and medical researcher statuses, respectively.

The relevance pane 102 also includes one or more information categories 114 that correspond to the query 110 and user status (for example, as determined by the selected window tab 112). In one embodiment, when the "Health" window tab 112 is selected and the search query 110 is "breast cancer," the information categories 114 include Drugs & Substance, Conditions, Procedures, In Clinical Studies, Complementary Medicine, Personal Health, Nutrition, and People. In another embodiment, when the "Research" window tab 112 is selected and the search query 110 is "breast cancer," the information categories 114 include Drugs & Substance, Conditions, In Clinical Studies, Molecular Biology, Genes, Research Centers, Experts, and Anatomy. As shown, the categories 114 of information displayed can change based upon a selected or predetermined user status and/or profile. In other cases, the categories 114 can be determined automatically, such as by a learning method, a dynamic learning method, an algorithmic, or an inferencing method, as known to those of skill in the art.

Each category 114 lists one or more concepts 116 related to the search query 110 that are determined based at least in part on the search query 110 and window tab 112. In one embodiment, the concepts 116 are or include keywords, terms, or information identifiers that a search engine has determined relevant to the provided search query 110 and/or selected window tab 112. Concepts 116 can be selected to further narrow or focus the search results, or may be selected to initiate new or additional searches or queries with a search engine. Additionally, concepts 116 can be selected to automatically generate summaries or explanations related to the concepts 116 and the search query 110.

Similarly, a relevance indicator 118, sometime referred to as a meter or a MEDSTORY METER™, is provided that corresponds to each of the displayed concepts 116. In one embodiment, the relevance indicator 118 includes a graphical display, such as a bar graph. Other such relevance indicators 118 may also be provided, such as numerical displays, animations, or any other such indicator 118. In one embodiment, when the relevance indicator 118 includes a bar graph, the length of the bar graph indicates greater relevance of the concept to the selected window tab 112 and search query 110. In some embodiments, the relevance indicator 118 indicates the connectivity between the concepts 116 and the search query 110.

The relevance pane 102 can include any number of window tabs 112. For example, the relevance pane 102 can include one, two, three, four, or more than four window tabs 112. The relevance pane 102 can also include any number of categories 114. For example, the relevance pane 102 can include one, two, three, four, or more than four categories 114. The relevance pane 102 can also include any number of concepts 116 related to each category 114. For example, the relevance pane 102 can include one, two, three, four, or more than four concepts 116. In addition, the relevance pane 102 can also include any number of relevance indicators 116 related to the concepts 116.

The channel pane 104 includes one or more channel selectors 120 that further organize the display of search results and/or search information. Channel selectors 120 are sometimes referred to as pipes, information pipes, or content pipes. Information in the channel pane 104 is organized, grouped, and/or sorted based upon the selected channel 120. The channel selectors 120 can be determined by the user interface 100 as a function of the search query 110 and/or window tab 112 selected. For example, in one embodiment, when the window tab 112 indicates that the user is a patient or someone interested in general health-related information, the user interface 100 includes The Web, News Media, Audio Video, Clinical Trials, and Research Articles channel selectors 120. In another embodiment, when the window tab 112 indicates that the user is a researcher, such as a medical researcher, the user interface 100 includes The Web, News Media, Clinical Trials, Research Articles, and NIH Grants channel selectors 120. Any number of channel selectors 120 can be provided. For example, some embodiments, two, three, four, five or more than five channel selectors 120 are provided.

In some embodiments, the channel selectors 120 include a "premier content" channel 120 that displays information, such as search results, directed to content of a predetermined high-quality, or pre-screened level. For example, a premier content channel can provide information from a specific database or information source, such as sources maintained or created by Reader's Digest, the Wall Street Journal, the New England Journal of Medicine, or any other such interest-specific or topic-specific information provider. Search results 122 are also provided in the channel pane 104. In one embodiment, the search results 122 are based upon the search query 110, selected window tab 112 and selected channel selector 120. For example, the search results 122 can be based upon a search query for "breast cancer," where the user is a patient, and where the user in interested in search results available from or generated by a general search of the Internet, or web, such as can be provided by a horizontal search engine. In other cases, the user may be interested in search results available from a topic-specific search engine, such as a vertical domain search engine, which can be configured to search a pre-determined domain of topic-relevant information. Vertical domains are well known to those of skill in the art, and can include information relevant to any of a variety of subjects, such as, for example, medical, health, travel, finance, law, entertainment, biographies, politics, economics, or any other subject.

The search results 122 each generally include a content element 124, a summary 126, and a location identifier 128, such as a Uniform Resource Locator (URL), web, or Internet Protocol (IP) address where the content element 124 can be found and/or retrieved. The location identifier 128 can reference a location on the Internet, a Local Area Network, a Wide Area Network, or any other type of information network. The content 124 can include text documents, video clips, audio clips, PODCASTs, or a combination of any of the above, or any other type of information.

In one embodiment, the user interface 100 displays information in the channel pane 104 based not only upon the search query 110, but also upon some other parameter or knowledge provided by or known to the search engine of the user interface 100. For example, search results 122 are displayed, selected, and/or ranked based upon system knowledge instead of or in combination with a measure of popularity. Search results 122 can be based upon a combination of the search query 110 and search engine knowledge.

In addition, the user interface 100 includes an advertisement pane 106. The advertisement pane 106 displays advertisements 130 that are related to any one or more of the search query 110, selected window tab 112, and selected channel selector 120. For example, in one embodiment, the user interface 100 displays advertisements 130 relevant to a medical patient, and in other embodiments, user interface 100 displays advertisements 130 relevant to a medical researcher, investor, clinician, or other user role type. In some cases the advertisements 130 on the advertisement pane 106 update each time a new search is performed or whenever the original search query 110 is changed. In one embodiment, as the user navigates deeper into the search, the advertisements 130 are selected anew from a nonfiltered pool of advertisements, and not merely selected from the pool of advertisements determined as a result of the initial search. This type of dynamic advertisement updating is sometimes referred to as "cascading advertising."

Figure 2:
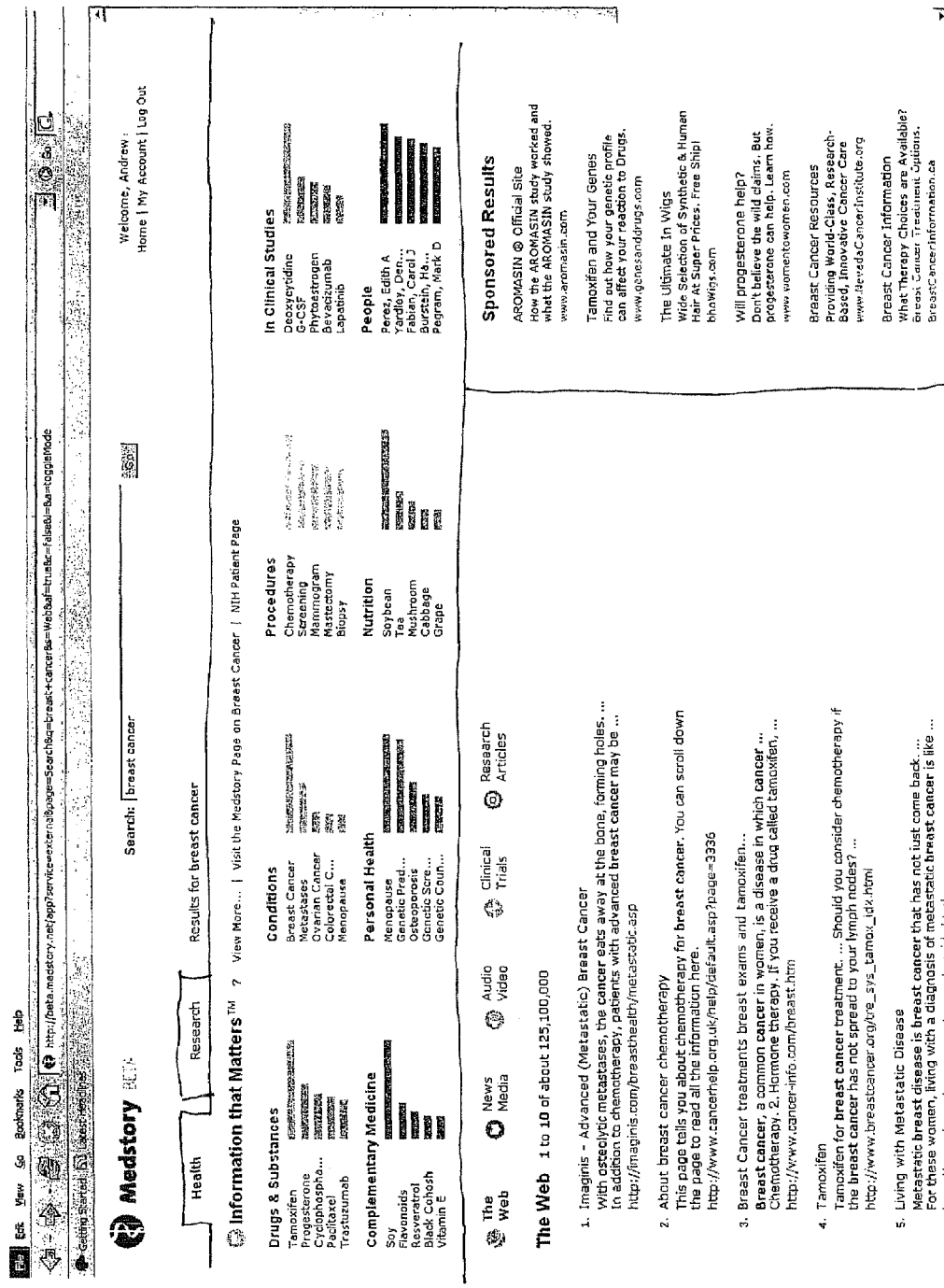

Additional embodiments of similar user interfaces are illustrated in FIGS. 2-16. FIG. 2 illustrates one embodiment of a user interface where the search query is "breast cancer", the window tab 112 is "Health," which corresponds to a medical patient or person interested in general healthcare information. The "The Web" channel selector has been selected. The user interface includes an option to "view more," which when selected, causes the user interface to display additional concepts and related relevance indicators for each category. One example of a user interface in which the "view more" option has been selected is illustrated in FIG. 3. The user interface allows the user the ability to view a specific web page that includes information specific to the search query. For example, as illustrated in FIG. 4, the user interface displays additional information categories.

Figure 5:
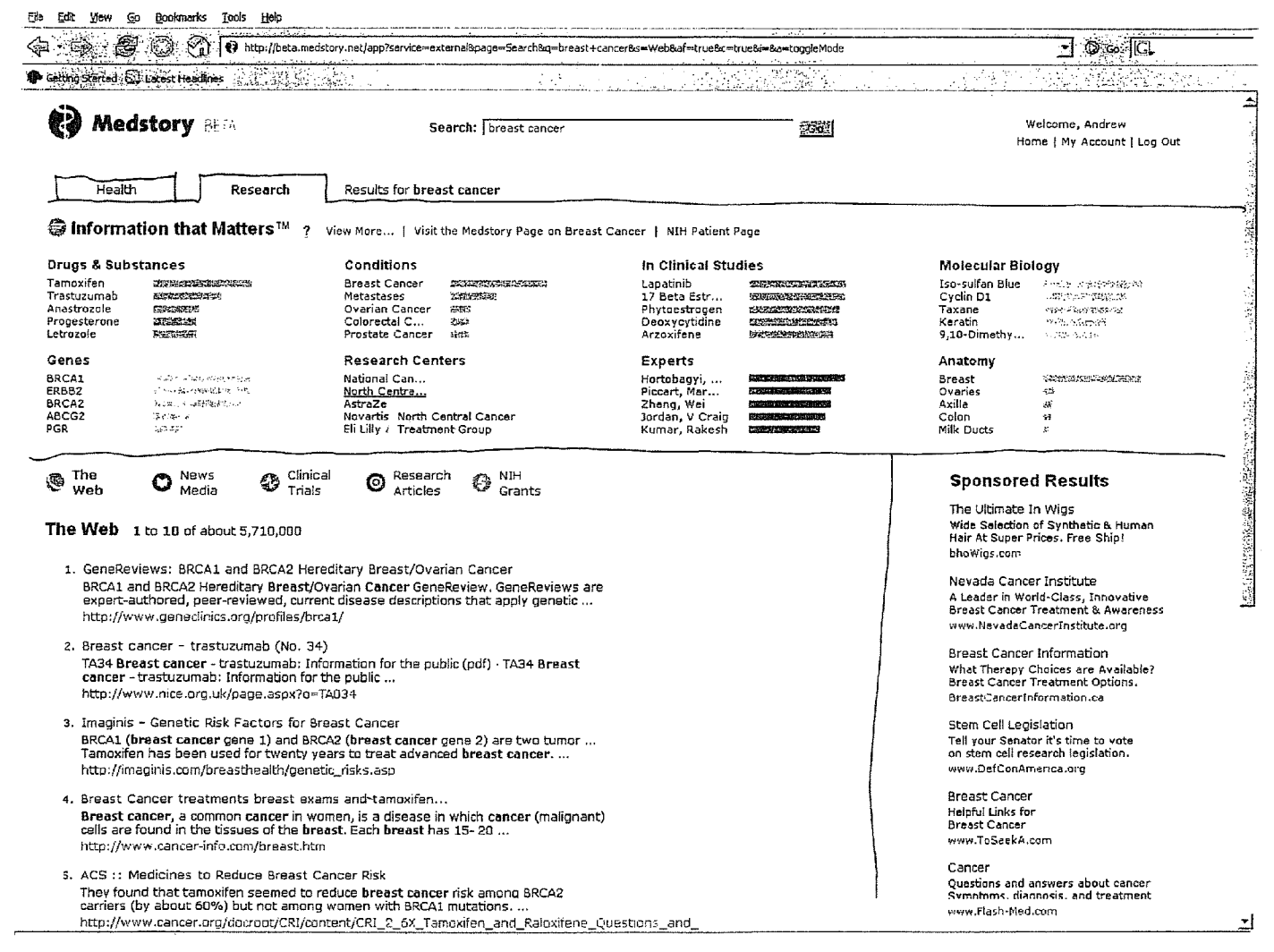
Figure 8:
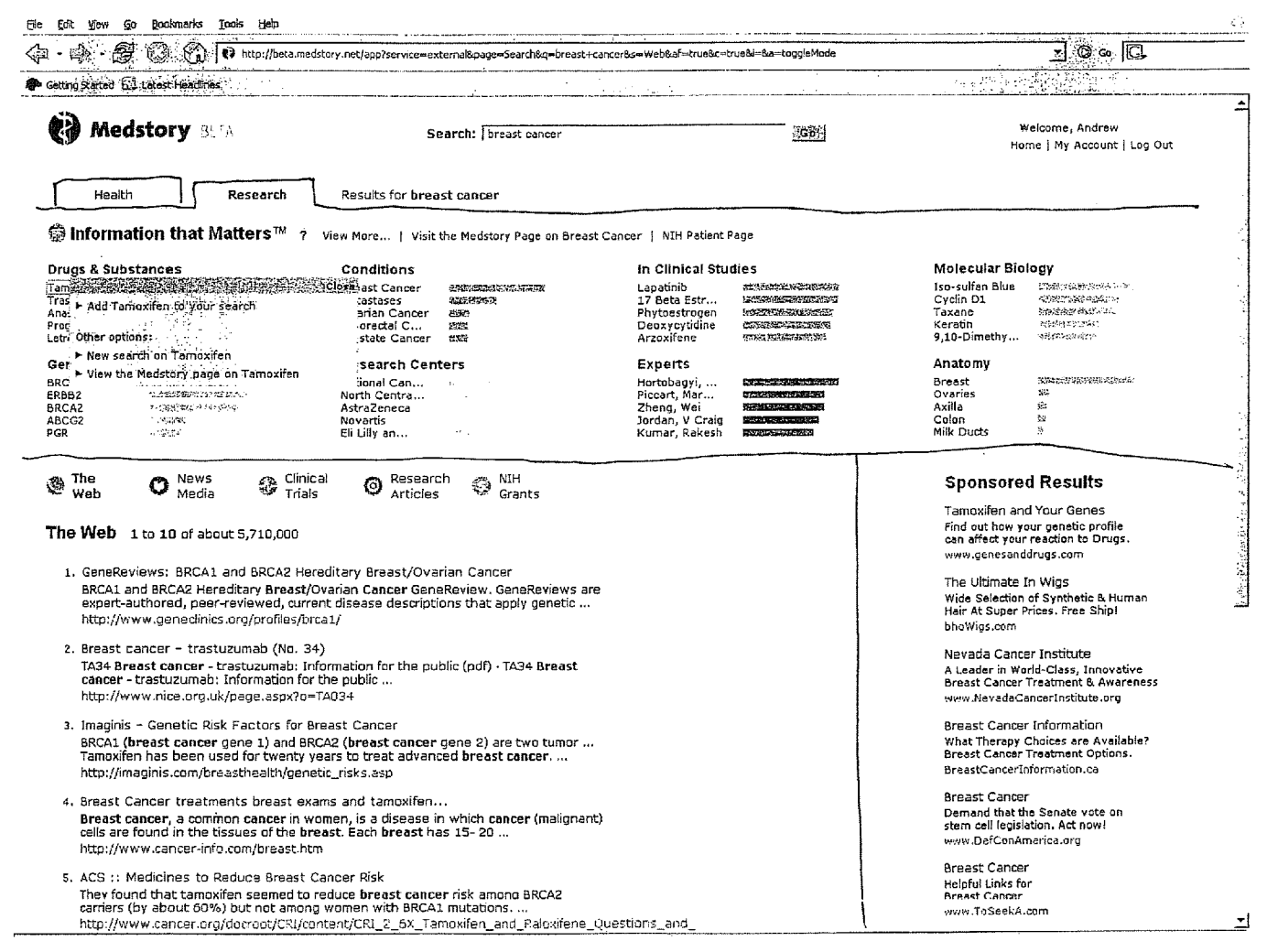
Figure 10:
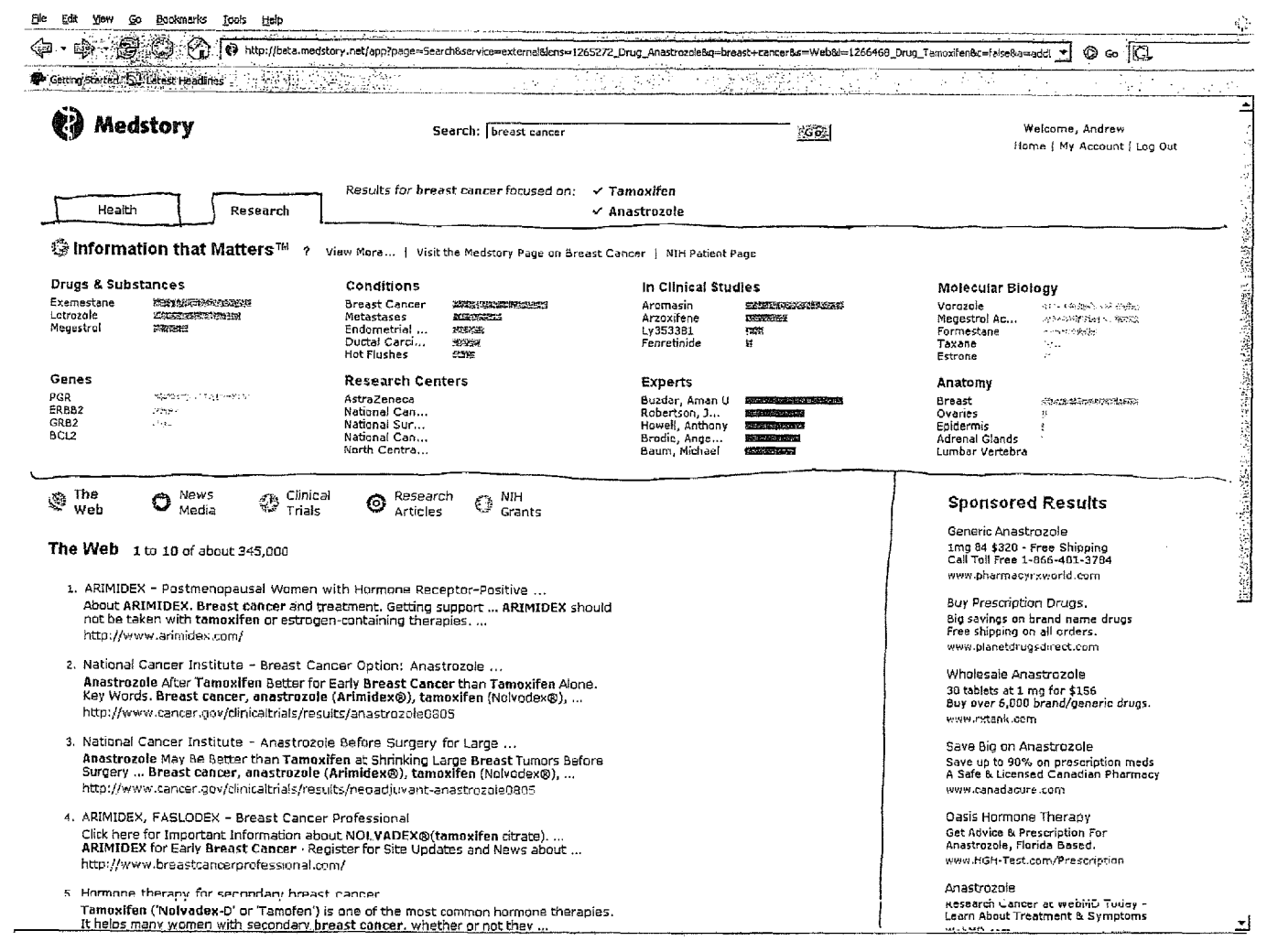

FIG. 5 illustrates a user interface in which a "Research" window tab has been selected. The user interface can display additional information related to each category, concept, and relevance indicator. For example, as illustrated in FIG. 6, the user interface displays additional information regarding a category when then user moves the cursor over or otherwise selects the category. In the illustrated example of FIG. 6, a window displaying a description of the "Drugs & Substances" category appears when the user moves the cursor of the category. Similar results can occur when the user moves the cursor over or otherwise selects a concept. In the illustrated example of FIG. 7, a window displaying a description of the "tamoxifen" category appears when the user moves the cursor over or otherwise selects the concept. In another embodiment, menu of additional search options appears when a concept is selected by the user. For example, as illustrated in FIG. 8, when the user selects a category, a menu appear. The menu provides the user the ability to further narrow his search query by adding the concept as an additional limitation to the search. The menu also provides the user the ability to initiate a new search specifically directed to the concept term, or to be directed to a specific, predetermined web-page regarding the concept. FIG. 9 illustrates one embodiment of a user interface in which the search query has been further narrowed by adding a concept as a limitation to the search. In the illustrated embodiment, the term "tamoxifen" has been added as an additional limitation to the initial search on "breast cancer." Multiple concepts can be used to limit a search query, as illustrated in FIG. 10. In the illustrated example of FIG. 10, the terms "tamoxifen" and "anastrozole" have been added as additional limitations to the initial search on "breast cancer."

Similarly, in another embodiment, additional menus and/or information are provided when the user moves the cursor over or otherwise selects a relevance indicator. For example, the embodiment of FIG. 11 illustrates a menu that appears when the user moves the cursor over a relevance indicator. Additional menus can be provided if the user selects a relevance indicator. For example, as illustrated in FIG. 12, when the user selects the relevance indicator corresponding to the "tamoxifen" concept, the user interface provides the illustrated menu. The menu allows the user to request additional information regarding the concept and search query, or the concept alone. In addition, the menu provides information regarding the search query and concept. In addition, the menu of the user interface identifies additional concepts that are relevant to or associated with the concept and search query.

While the foregoing discussion of FIGS. 2-12 reviewed the contents of the relevance panes of the illustrated embodiments, it should be clear to those of skill in the art that the illustrated embodiments of FIGS. 2-12 also include channel and advertisement panes, as discuss above with respect to FIG. 1. FIGS. 13-16 illustrate channel panes in which different channel selectors have been selected. For example, while FIGS. 2-12 illustrate channel panes in which a "The Web" channel is selected, FIGS. 13-16 illustrate channel panes in which "News & Media," "Clinical Trials," "Research Articles," and "NIH Grants" channels have been selected, respectively.

In addition, referring back to FIGS. 2 and 5, the advertisements provided in the advertisement panes of the illustrated user interfaces varies as different window tabs are selected. For example, in FIG. 2 the user has selected the "Health" window tab, indicating that the user is a medical patient or someone interested in general health information. Advertisements in the advertising pane are selected and displayed based upon the selected window tab and search query. In the embodiment of FIG. 5, the user has selected the "Research" window tab, indicating that the user is a medical researcher; therefore, the user interface displays advertisements in the advertisement pane that might be of interest to a medical researcher interested in the subject matter of the search query. The advertisements in the advertisement pane of FIG. 5 are therefore different from those of FIG. 2. In addition, the advertisements can be further limited, filtered, or determined based upon any concepts selected by the user and/or by a history of searches conducted by the particular user. The user's searching history can be recorded or temporarily saved to help determine search results, concepts, and/or advertisements to display, which are of interest or relevant to the user.

A computer system may be used to implement any one or more of methodologies or user interfaces described herein. An exemplary computer system includes a processor (e.g., a central processing unit (CPU), a graphics processing unit (GPU), or both), a main memory and a static memory, which communicate with each other via a bus. The computer system can further include a video display unit (e.g., a liquid crystal display (LCD) or a cathode ray tube (CRT)). The computer system also includes an alphanumeric input device (e.g., a keyboard), a user interface (UI) navigation device (e.g., a mouse), a disk drive unit, a signal generation device (e.g., a speaker) and a network interface device. In another embodiment, the methodologies or user interfaces described herein are implemented on a handheld or portable computing device, including any device able to connect to a wired or wireless computer network. The disk drive unit includes a machine-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting machine-readable media. The software may further be transmitted or received over a network via the network interface device.

Any other computer and/or digital information processing systems can also be used to implement any one or more of the methods, systems or devices described herein. For example, in other embodiments, the computer includes a personal digital assistant, a wireless or cellular telephone, a digital music player, such as an IPOD®, or any other such computing device known to those of skill in the art.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although this invention has been disclosed in the context of certain preferred embodiments, it will be understood by those skilled in the art that the present invention extends beyond the specifically disclosed embodiment to other alternative embodiments and/or uses of the invention and obvious modifications and equivalents thereof. In particular, while the present domain knowledge-assisted information processing system and methods have been described in the context of a particularly preferred embodiment, the skilled artisan will appreciate, in view of the present disclosure, that certain advantages, features and aspects of the information communication system, device, and method may be realized in a variety of other applications and software systems. Additionally, it is contemplated that various aspects and features of the invention described can be practiced separately, combined together, or substituted for one another, and that a variety of combination and sub combinations of the features and aspects can be made and still fall within the scope of the invention.

Those of skill in the art will understand that information and signals can be represented using a variety of different technologies and techniques. For example, data, instructions, commands, information, signals, bits, symbols, and chips that can be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein can be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should, not be interpreted as causing a departure from the scope of the present invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or other form of storage medium known in the art. A storage medium is coupled to the processor, such that the processor can read information from, and write information to, the storage medium. In the alternative, the storage medium can be integral to the processor. The processor and the storage medium can reside in an ASIC. The ASIC can reside in a user terminal. The processor and the storage medium can reside as discrete components in a user terminal. The previous description of the disclosed embodiments is provided to enable a person skilled in the art to make or use the present invention. Various modifications to these embodiments will be readily apparent to those skilled in the art, and the generic principles defined herein can be applied to other embodiments without departing from the spirit or scope of the invention. Thus, the invention is limited only by the claims that follow. Thus, it is intended that the scope of the present invention herein disclosed should not be limited by the particular disclosed embodiment described above, but should be determined only by a fair reading of the claims that follow.

Figure 17:
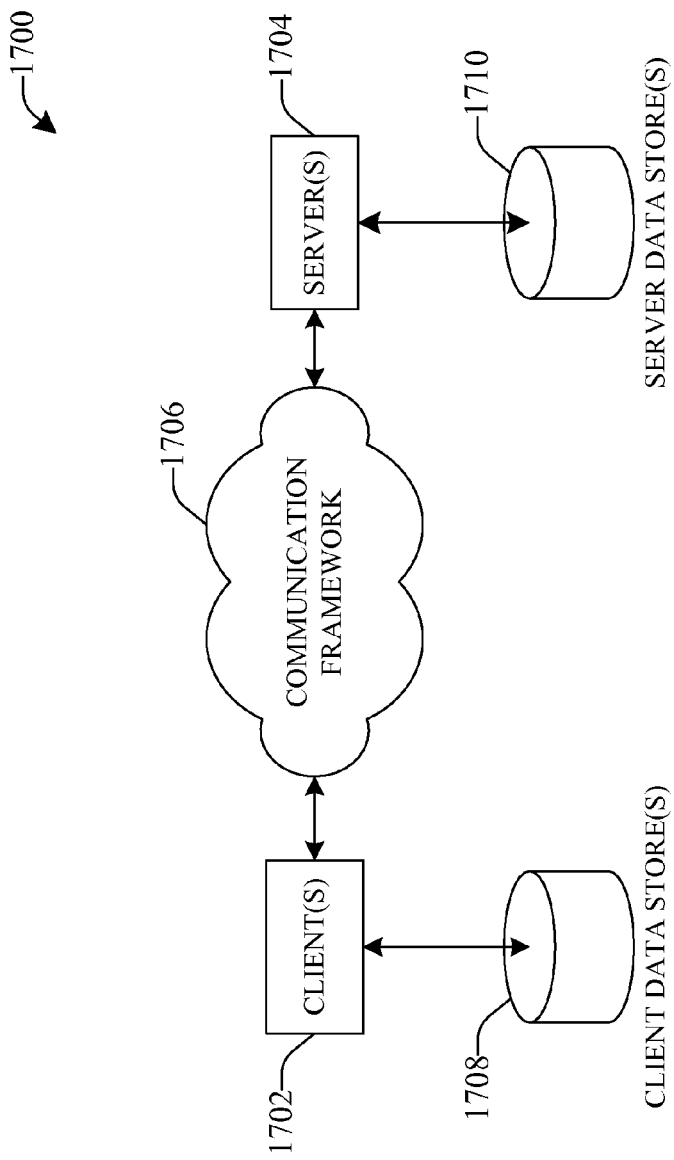
FIGS. 17 and 18 illustrate computing environments for carrying out various aspects described herein.

FIG. 17 illustrates a schematic block diagram of a computing environment 1700 in accordance with the subject specification. The system 1700 includes one or more client(s) 1702. The client(s) 1702 can be hardware and/or software (e.g., threads, processes, computing devices). The client(s) 1702 can house cookie(s) and/or associated contextual information by employing the specification, for example.

The system 1700 also includes one or more server(s) 1704. The server(s) 1704 can also be hardware and/or software (e.g., threads, processes, computing devices). The servers 1704 can house threads to perform transformations by employing the specification, for example. One possible communication between a client 1702 and a server 1704 can be in the form of a data packet adapted to be transmitted between two or more computer processes. The data packet may include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

Figure 18:
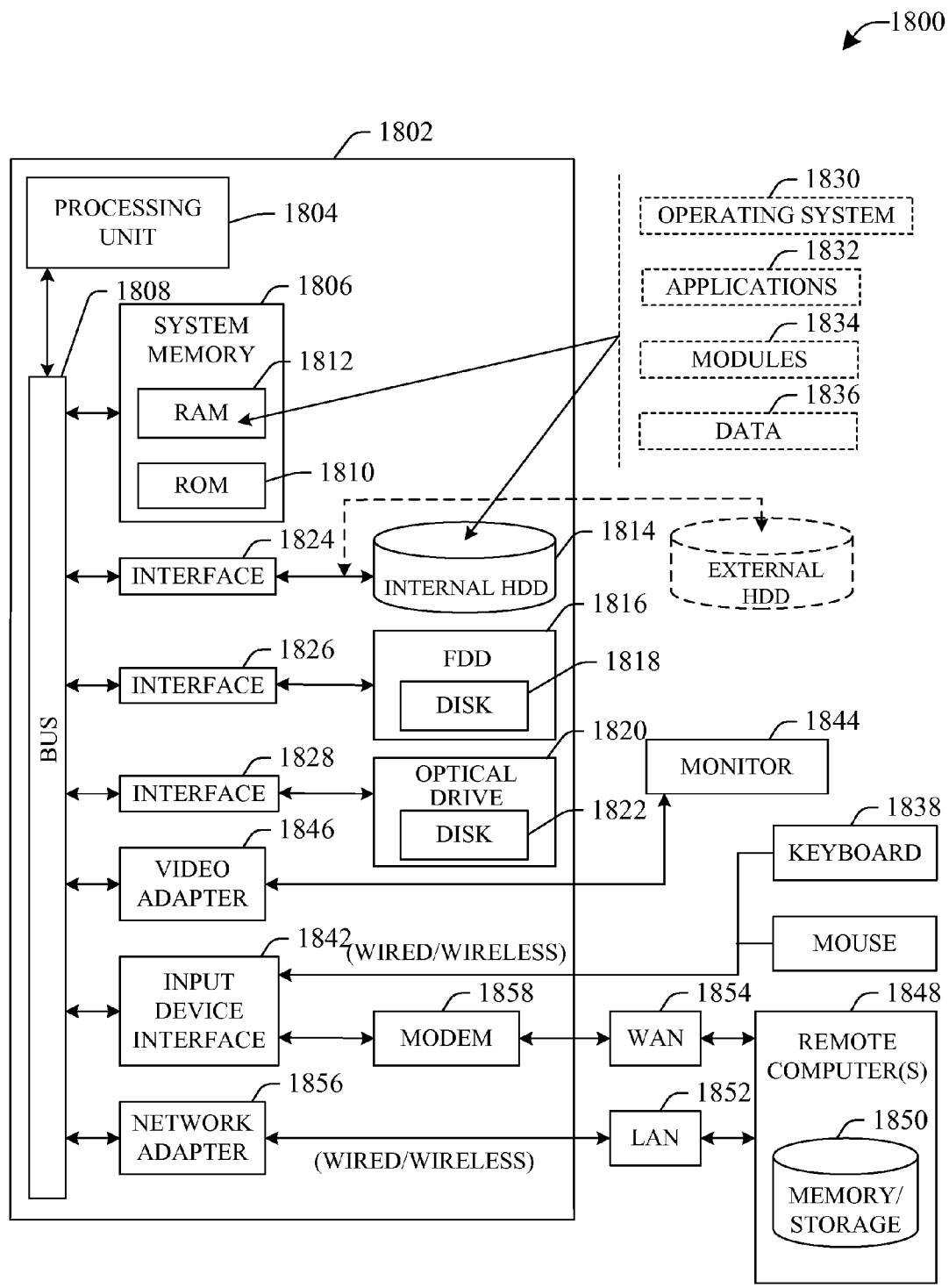

FIG. 18 illustrates a block diagram of a computer operable to execute the disclosed architecture. In order to provide additional context for various aspects of the subject specification, FIG. 18 and the following discussion are intended to provide a brief, general description of a suitable computing environment 1800 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In FIG. 18, the example environment 1800 for implementing various aspects of the specification includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is appreciated that the specification can be implemented with various commercially available operating systems or combinations of operating systems.

A user can enter commands and information into the computer 1802 through one or more wired/wireless input devices, e.g., a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which may connect to a global communications network, e.g., the Internet.

When used in a LAN networking environment, the computer 1802 is connected to the local network 1852 through a wired and/or wireless communication network interface or adapter 1856. The adapter 1856 may facilitate wired or wireless communication to the LAN 1852, which may also include a wireless access point disposed thereon for communicating with the wireless adapter 1856.

When used in a WAN networking environment, the computer 1802 can include a modem 1858, or is connected to a communications server on the WAN 1854, or has other means for establishing communications over the WAN 454, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are example and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates displaying search results, comprising:
    at least one processor that executes the following computer executable components stored on at least one computer storage readable medium:
    a search engine component that receives and executes queries on behalf of a user;
    an analysis component that filters and organizes query results as a function of relevancy of the data to the user and associated context of a query; and
    a user interface component that displays, in a same page of a web search engine, a query window to receive the queries, a relevance pane including one or more information categories that correspond to a query and to a selected tab identifying a user role, and a channel pane to display selectable information channels corresponding to the query and to the selected tab identifying the user role, wherein a relevance indicator graphically conveys, in terms of relative length of the relevance indicator, relevance of each of the one or more information categories: and
    wherein the user interface component further, based on user interaction with a relevance indicator in the relevance pane, displays a menu window in the same page, wherein the menu window provides information concerning a concept and a query corresponding to the relevance indicator, identifies additional concepts that are relevant to the concept and the query, and enables a user to request additional information regarding the concept and the query.

2. The system of claim 1, wherein the user interface component can dynamically modify display settings as a function of content and type of information displayed, user state, user preferences, explicit learning, implicit learning, or user intent.

3. The system of claim 1, further comprising an artificial intelligence (AI) component that determines or infers user intent, user state, user context, user goals, and relevancy of results.

4. The system of claim 3, the AI component employs a probabilistic-based or statistical-based analysis in connection with making determinations or inferences.

5. The system of claim 1, wherein the user interface component further displays an advertisement pane.

6. The system of claim 5, the advertisement pane displays targeted advertisements that are a function of search results and user profile information.

7. The system of claim 1, wherein the categories of information are determined automatically by at least one of: a learning method, a dynamic learning method, an algorithmic, or an inferencing method.

8. The system of claim 1, the search engine component employs a topic-specific search engine configured to search a pre-determined domain of topic-relevant information.

9. The system of claim 1, wherein the user interface component further displays a research tab that displays information and tools relating to performing research on topics related to the search results.

10. The system of claim 9, wherein the user interface component further displays a menu that provides for further refining search queries or results by selecting one or tabs or concepts associated with previous search results.

11. A method that facilitates displaying search results, comprising:
    employing a processor to execute computer readable instructions stored on a computer storage readable medium to perform the following acts:
    displaying, in a same page of a web search engine, a query window to receive queries, a relevance pane including one or more information categories that correspond to a query and to a selected tab identifying a user role, and a channel pane to display selectable information channels corresponding to the query and to the selected tab identifying the user role, wherein a relevance indicator graphically conveys, in terms of relative length of the relevance indicator, relevance of each of the one or more information categories;

receiving a search query relating to medical/health information from a user;

receiving a selection of a tab identifying a user role;

executing the search query;

analyzing results of the search query;

selectively filtering, organizing, and presenting the search query results as a function of relevancy to the user and the selection of the tab identifying a user role; and based on user interaction with a relevance indicator in the relevance pane, displaying a menu window in the same page, wherein the menu window provides information concerning a concept and a query corresponding to the relevance indicator, identifies additional concepts that are relevant to the concept and the query, and enables a user to request additional information regarding the concept and the query.

12. A computer storage readable medium embodying thereon computer-executable instructions for carrying out the acts of claim 11.

13. The method of claim 11, further comprising displaying an advertisement in the same page of the web search engine, based on the query and the selected role identifier.

14. A system that facilitates displaying search results, comprising:

at least one processor that executes the following computer executable components stored on at least one computer storage readable medium:

means for receiving a search query relating to medical/health information;

means for executing the search query;

means for analyzing search query results based at least in part on a selected identifier corresponding to a predetermined user role;

means for selectively filtering, organizing, and presenting the search query results as a function of relevancy to the user; and means for displaying, in a same page of a web search engine, a query window to receive the queries, a relevance pane including one or more information categories that correspond to a query and to a selected tab identifying a user role, and a channel pane to display selectable information channels corresponding to the query and to the selected tab identifying the user role, wherein a relevance indicator graphically conveys, in terms of relative length of the relevance indicator, relevance of each of the one or more information categories;

wherein the means for displaying further, based on user interaction with a relevance indicator in the relevance pane, displays a menu window in the same page, wherein the menu window provides information concerning a concept and a query corresponding to the relevance indicator, identifies additional concepts that are relevant to the concept and the query, and enables a user to request additional information regarding the concept and the query.

* * * * *